Sept. 12, 1961 R. C. BINDER 2,999,894
APPARATUS FOR SUPPRESSING GALLOPING CONDUCTORS
Filed Jan. 6, 1958 3 Sheets-Sheet 1

INVENTOR.
Raymond C. Binder,
BY Brown, Jackson,
Boettcher & Dienner
ATTYS.

Sept. 12, 1961 R. C. BINDER 2,999,894
APPARATUS FOR SUPPRESSING GALLOPING CONDUCTORS
Filed Jan. 6, 1958 3 Sheets-Sheet 2
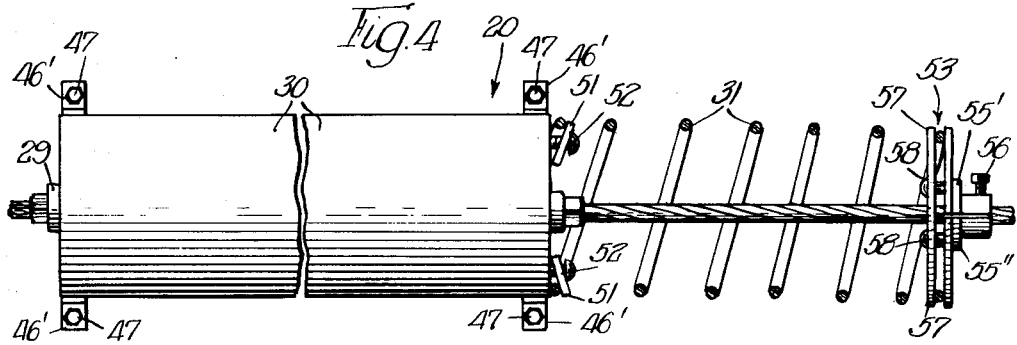
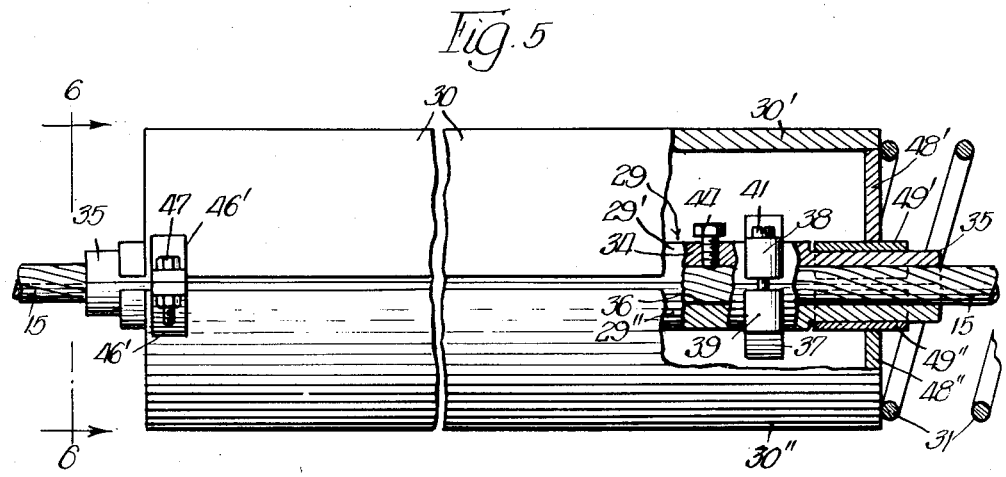
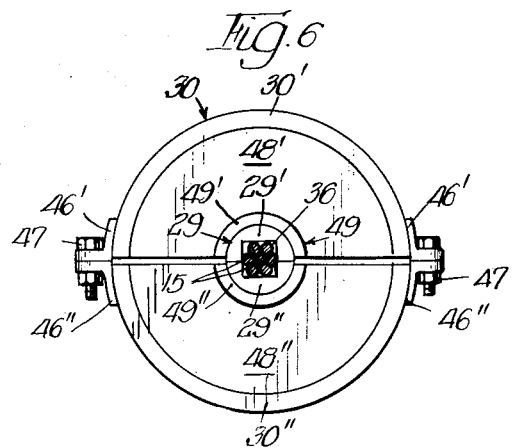
INVENTOR.
Raymond C. Binder,
BY Brown, Jackson,
Boettcher & Dienner
Attys.

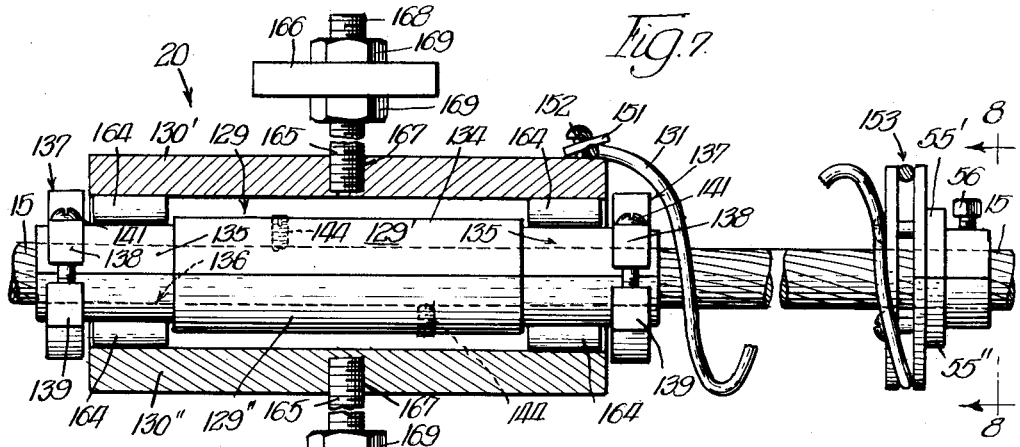
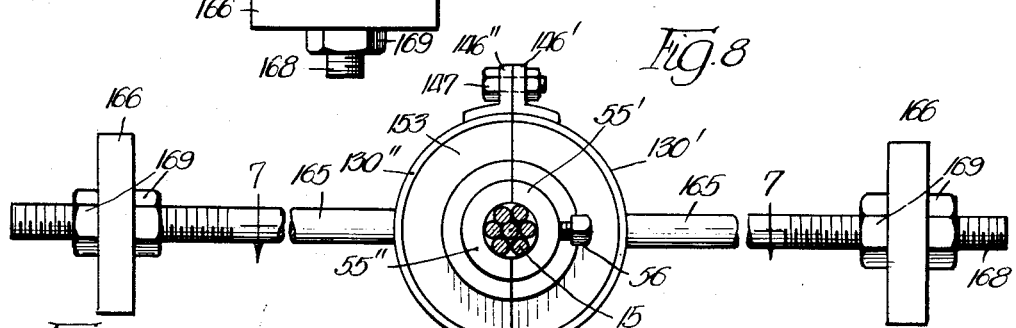
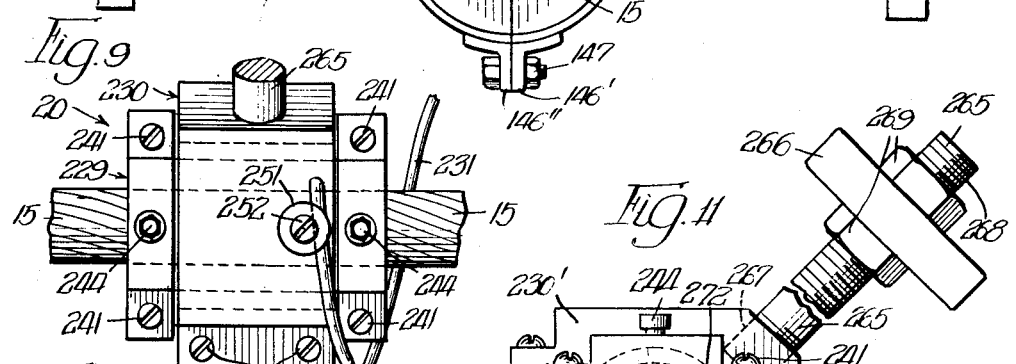
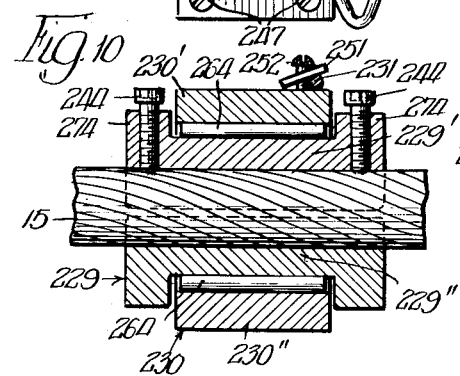
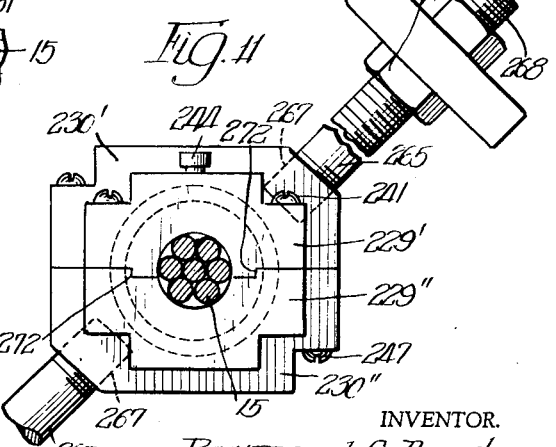
Sept. 12, 1961  R. C. BINDER  2,999,894
APPARATUS FOR SUPPRESSING GALLOPING CONDUCTORS
Filed Jan. 6, 1958  3 Sheets-Sheet 3
INVENTOR.
Raymond C. Binder,
BY Brown, Jackson,
Boettcher & Dienner
Attys United States Patent Office 2,999,894
Patented Sept. 12, 1961

2,999,894
APPARATUS FOR SUPPRESSING
GALLOPING CONDUCTORS
Raymond C. Binder, West Lafayette, Ind., assignor to Purdue Research Foundation, Lafayette, Ind., a corporation of Indiana
Filed Jan. 6, 1958, Ser. No. 707,217
10 Claims. (Cl. 174—42)

The present invention relates to improved apparatus for suppressing or mitigating the large amplitude oscillations of aerial conductors, commonly referred to as "galloping." The large amplitude galloping oscillations in suspended aerial conductors are always wind-induced, but they do not essentially require high velocity winds, because conductors have been observed to gallop rather vigorously under ordinary wind conditions. In high voltage electrical transmission lines having long spans between towers or supporting structures, the occurrence of these large amplitude galloping oscillations often results in considerable damage to the lines and to the overhead supporting structures. Violence of the galloping is often sufficient to cause contact between adjacent conductors, with resulting tripping out of the line or breakage of one of the conductors, and in a general storm may constitute a serious threat to continuity of service. Because of its seriousness, this problem has prompted much study and research in the hope of finding a practical solution.

Many devices for suppressing galloping have been proposed, but those known to me have for the most part been subject to the objections of lack of effectiveness, high cost of manufacture and installation, etc.

As a result of extensive study and experimentation with full scale installations of suspended conductors operating under actual wind conditions, I have devised improved apparatus which operates upon what is apparently a new principle of suppressing galloping oscillations. This new principle is based upon the finding that in addition to the vertical component of motion visible in all galloping phenomena, there is also a very substantial torsional component of motion in the conductor tending to cause twisting and untwisting therein. In other words, there appears to be a coupled action or coupled relation between the vertical motion and the torsional motion of the conductor in all or substantially all galloping oscillations. Also, this coupling action appears to be quite important in the initial or build-up period of natural galloping. Full scale line tests and wind tunnel model tests have shown that when the natural torsional frequency of vibration is substantially equal to the natural vertical frequency of vibration, galloping of severe magnitude is likely to take place; but that when the natural torsional frequency is definitely different from the natural vertical frequency galloping is eliminated or greatly suppressed. For example, for a conductor having a given span, thickness, tension, etc., galloping only occurs in a certain range of torsional inertia values. If the torsional inertia is changed to be outside of this range, then galloping will not occur, or will be greatly mitigated. It should be noted that the problem is not necessarily to eliminate galloping altogether, but to reduce galloping to a point within safe limits.

The Kármán vortex trail may or may not be present during the initial start of galloping. The Kármán vortex trail seemingly is not involved after galloping has developed. It appears that the twisting of the conductor controls the shedding of the vortices behind the conductor. This shedding apparently is essential in the energy transfer from the air to the conductor. Thus, based on this theory of galloping being influenced by the Kármán vortex trail, galloping can be prevented or minimized by disturbing the shedding produced by the angular movement. Hence, apparatus which spoils the periodic shedding behind the conductor would prevent or minimize galloping.

Based upon the above findings, it is one of the objects of the present invention to provide improved apparatus which acts to suppress galloping by adding torsional inertia to the conductor.

Another object of the invention is to provide improved suppression apparatus which will permit a large degree of relative rotative movement between the torsional inertia device and the conductor.

Another object is to provide improved suppression apparatus in which the torsional inertia can be readily adjusted.

Another object is to provide improved suppression apparatus which will be of low manufacturing cost and which can be quickly and easily installed.

Other objects, features and advantages of the invention will be apparent from the following detail description of several embodiments thereof. In the accompanying drawings illustrating these embodiments:

FIGURE 4 is a fragmentary side elevational view of a more developed embodiment of my improved suppression device;

FIGURE 5 is a fragmentary view, partly in elevation and partly in section, of the rotatable inertia element, taken at right angles to FIGURE 4;

FIGURE 6 is an end view of the inertia device, corresponding to a section taken on the plane of the line 6—6 of FIGURE 5;

FIGURE 7 is a longitudinal sectional view through another embodiment of my invention;

FIGURE 8 is an end view thereof, taken on the plane of the line 8—8 of FIGURE 7, and showing the outwardly extending inertia arms;

FIGURE 9 is a side elevational view of another embodiment of torsional damper;

FIGURE 10 is a longitudinal sectional view through this embodiment, and

FIGURE 11 is a fragmentary end view of the latter embodiment.

Figure 1:
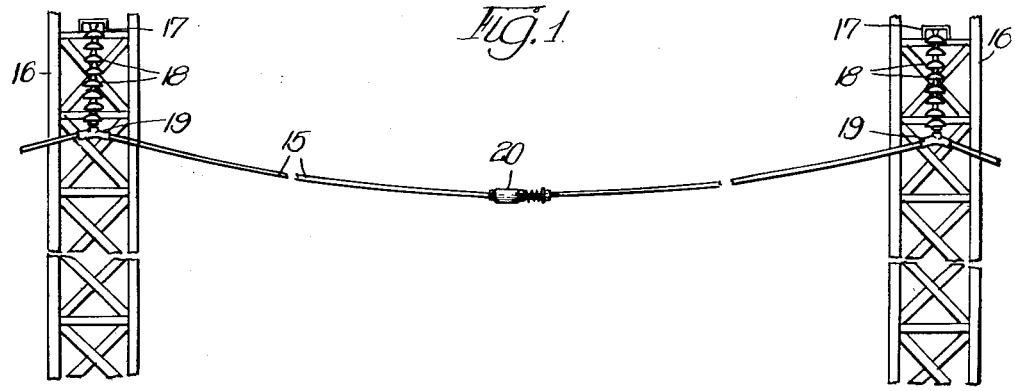
FIGURE 1 is a diagrammatic elevational view showing one conductor of a high voltage transmission line, and illustrating schematically my improved suppression device mounted midway in the span of this high voltage conductor.

In FIGURE 1 I have diagramatically illustrated a portion of a high voltage transmission line wherein the conductors 15 are suspended in long spans between supporting towers or poles 16, only one of these conductors being shown. These supporting towers or poles are generally provided with outwardly projecting cross arms 17 having high voltage insulators 18 suspended therefrom, the conductor 15 being suspended at the lower end of the insulator string through a mounting clamp 19. The insulators 18 can swing relatively to the cross arms 17, and the conductors 15 are usually arranged in groups of three for a conventional three-phase circuit, the length of span between towers or poles 16 ranging anywhere from 100 feet to 1,000 feet, or possibly longer. My improved torsional damper, indicated in its entirety at 20, is shown mounted on the conductor substantially at the mid-point of its span, only one torsional damper being shown, but it being understood that in the case of relatively long spans a plurality of such torsional dampers may be mounted on each span.

Figure 2:
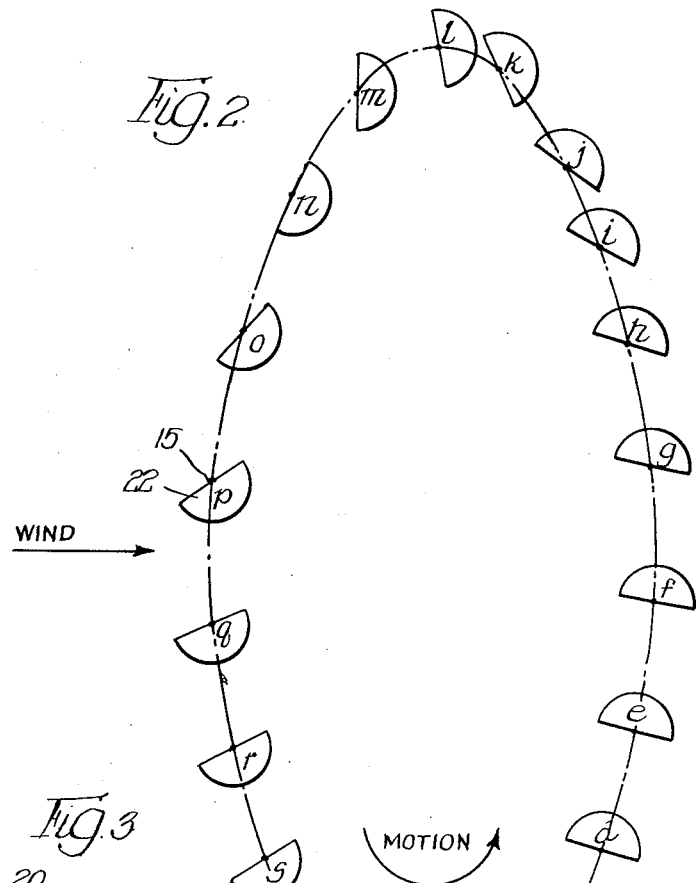
FIGURE 2 is a schematic diagram showing the orbit of galloping motion of a suspended conductor as viewed from the end of the span, the vertical displacement or vertical amplitude of motion in this diagram being foreshortened with respect to the horizontal torsional displacement in order to show the different angular positions of the half-round airfoil to better advantage.

Before describing the construction of my improved torsional damper, I direct attention to FIGURE 2 showing a typical foreshortened orbit of galloping motion of a suspended conductor as viewed from the end of the mid-span point. A half-round or D-shaped airfoil 22 was rigidly fixed to the conductor 15, preferably with its flat face opposing the direction of the wind, this airfoil being several feet long in the case of full scale field tests. Motion pictures were taken, at approximately 64 frames per second, to show the orbit followed by the half-round airfoil 22 during typical galloping oscillations. FIGURE 2 illustrates a typical orbit, the letters along the orbit indicating the sequence of the positions taken by the airfoil 22 during the motion of the airfoil through the orbit. The orbit is illustrated foreshortened vertically in order to illustrate the different angular positions of the airfoil on a larger scale, the vertical dimension of the actual orbit being approximately 120 inches and the horizontal dimension being approximately 10 inches. FIGURE 2, compiled or plotted from the aforesaid motion pictures, clearly shows the torsional twisting of the conductor during the vertical displacement in the galloping oscillation. It will be observed that in the proportions and under the conditions present in the test, the angular twist of the conductor 15 was almost 180°, i.e. the angular displacement between positions $f$ or $g$ and $p$ or $q$ is almost 180°. It will also be seen from FIGURE 2 that the angular twist of the conductor is substantially out of phase with the vertical displacement. Under the particular proportions and conditions of the test, the angular twist was approximately 90° out of phase with the vertical displacement, i.e. the airfoil 22 was at its maximum angle of twist (positions $f$ and $g$ or $p$ and $q$), when the conductor was passing through the neutral point in its vertical oscillation of movement. Similar tests with wind tunnel models showed a similar twisting motion during the galloping oscillation.

Testing apparatus was then applied to the conductor span, such as enabled different measured degrees of twisting torque to be applied to the conductor. It was found in the field test lines that galloping was eliminated or very largely suppressed when the natural torsional frequency of the line was definitely different from the natural vertical frequency. Objectionable galloping took place when these two frequencies were made substantially equal. A similar result was found with wind tunnel models.

Figure 3:
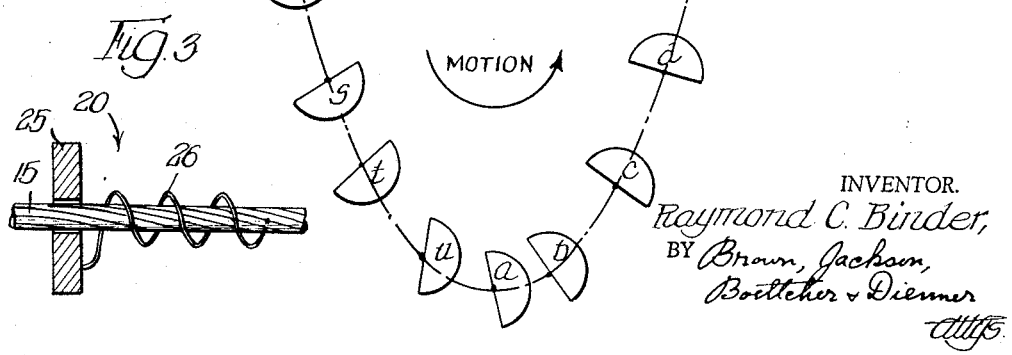
FIGURE 3 is a diagramatic sectional view showing one simple embodiment of my improved suppression apparatus.

Accordingly, I have devised an improved torsional damper for mounting on the conductor span, which operates to damp or modify the torsional frequency of the conductor. A rudimentary form of this damper is shown in FIGURE 3. In this embodiment, the damper comprises a circular or cylindrical form of torsional inertia device 25 which is rotatably mounted on the conductor 15. A torsional spring 26 surrounds the conductor, with one end fastened to the inertia device 25 and the other end fastened to the conductor, whereby the inertia device is free to rotate in either direction on the conductor under the damping influence of the spring 26. This rudimentary form shown in FIGURE 3 serves to illustrate the principle of the torsional damper.

Referring now to a more developed embodiment shown in FIGURES 4, 5 and 6, the main elements of this embodiment comprise a long bearing sleeve 29 secured over the conductor 15, an outer inertia cylinder 30 rotatably journalled on the bearing sleeve 29, and a torsion damping spring 31 connected at one end to the inertia cylinder 30 and at the other end to the conductor. The inner bearing sleeve 29 comprises a relatively thick central portion 34, from the opposite ends of which project reduced bearing extensions 35, 35. This bearing sleeve 29 is split longitudinally into two semi-circular halves 29' and 29" to permit this bearing sleeve to be assembled over any point in the length or span of the conductor 15. The bore 36 for passing the conductor 15 through these bearing sleeve halves is shown as being of square cross-section (FIGURE 6), but it may be circular or any other shape. Located near the opposite ends of the relatively thick central portions 34 are split clamps 37 which firmly bind the split halves of the bearing sleeve together over the conductor 15. The two halves of each clamp 37 may be constructed separately from the bearing sleeve halves 29', 29", or they may be formed integral therewith. These clamps 37 comprise outwardly projecting ears 38 and 39 for receiving clamping screws 41 which pass freely through the ears 38 and thread into tapped holes in the ears 39. When the clamps 37 are constructed separately from the split bearing sleeve 29 they are preferably both assembled over the split bearing sleeve so that the parting plane between the clamp ears 38 and 39 matches with the parting plane between the halves 29' and 29" of the bearing sleeve. As previously described, the clamps 37 may be joined as parts of the bearing sleeve halves 29', 29", as by forming the clamping ears 38 and 39 as integral outward projections from the bearing sleeve halves. A set screw 44 screws through a tapped hole in the thick portion of one or both of the bearing sleeve halves for exerting a binding pressure against the conductor 15 to lock the bearing sleeve 29 to the conductor against rotational or shifting movement.

The rotatable outer inertia cylinder 30 is also split longitudinally into two semi-cylindrical halves 30' and 30" to enable this cylinder to be assembled over the inner bearing sleeve 29 at any point along the length or span of conductor 15. Those cylinder halves 30', 30" are provided with clamping ears 46', 46" projecting outwardly from their ends at the split line, through which ears pass clamping bolts 47. The ends of this inertia cylinder are supported by disks which are also split into halves 48', 48" and are welded or otherwise secured at their outer peripheral portions to the cylindrical halves 30', 30". The centrally apertured inner portions of these disk halves are welded or otherwise secured to the split halves 49', 49" of bearing sleeves 49 which have rotatable mounting on the reduced end portions 35 of the non-rotative inner sleeve halves 29', 29". The clamping ears 46', 46" come into abutment before the bearing sleeve halves 49', 49" begin to bind on the non-rotative inner sleeve 29, so that the outer inertia cylinder 30 remains freely rotatable on the inner sleeve 29.

The torsion damping spring 31 has one end clamped to the end of the rotatable inertia cylinder 30 by separate clamping washers 51 secured to the cylinder end by screws 52. The other end of the spring 31 has fixed anchorage to the conductor 15 by way of a spring clamp 53. This clamp 53 comprises a back disk and hub portion split into two halves 55', 55", through one of which threads a set screw 56 for rigidly anchoring the spring clamp 53 to the conductor 15. A radially slotted front disk or bar 57 clamps the end convolution of the spring 31 against the back disk 55, this front disk or bar being secured by screws 58 threading into the back disk halves 55', 55". The torsion spring 31 can be threaded over the conductor 15, and the split construction of the cylinder ends 49', 49" and of the clamping disk halves 55' and 55" enables these parts to be assembled over the conductor at any point in its span.

The inertia of the cylinder 30 and the torsional deflection stress of the spring 31 are preferably proportioned with respect to the diametrical size of the conductor 15 and its length of span between supports, whereby the device exerts a substantial degree of torsional damping on the conductor. It will be observed that by virtue of the substantial length of the torsional spring 31, there can be a large amplitude of relative rotative movement between the cylinder 30 and the conductor 15, in excess of 180° or more.

In FIGURES 7 and 8 I have illustrated a modified construction of my invention in which the outer inertia cylinder has roller bearing mounting on the inner bearing sleeve, and in which this outer cylinder also carries added inertia in the form of weights on rods projecting outwardly from the cylinder. In this embodiment, the non-rotative inner bearing sleeve 129, which is comparable to the previously described bearing sleeve 29, has a thick central portion 134 and reduced end bearing portions 135. This sleeve is split longitudinally into two halves 129' and 129", and has a central bore 136 of square or round formation for receiving the conductor 15. Embracing the reduced bearing ends of this split bearing sleeve 129 are split clamps 137 having end bosses 138 and 139 through which pass clamping screws or bolts 141. The rotatable outer cylinder 130 in this embodiment is also split longitudinally into two halves 130' and 130", similarly to cylinder 30, these two halves being held together by bolts 147 passing through clamping ears 146' and 146" projecting outwardly from the ends of the cylinder halves (FIG. 8). A plurality of independent bearing rollers 164 are arranged at opposite ends of the rotatable outer sleeve 130 between the bore of this sleeve or cylinder and the reduced bearing ends 135 of inner bearing sleeve 129. These bearing rollers 164 are held against outward shifting displacement by the split clamps 137, and are held against inward shifting displacement by the shoulders formed at the ends of the thick central portion 134. These anti-friction rollers minimize the corrosive effect of weather conditions, and insure that the outer inertia cylinder 130 will remain freely rotative on the inner bearing sleeve 129. One or more set screws 144, preferably of the Allen head type, may be employed for firmly anchoring the inner bearing sleeve 129 to the conductor 15.

Projecting outwardly from the inertia cylinder 130 at two or more diametrically opposite locations are radially extending rods 165 carrying inertia weights 166 near their outer ends. The inner ends of these rods may be threaded or welded in holes 167 provided in the inertia cylinder halves. The outer ends of the rods 165 may be provided with threads 168 for receiving inner and outer lock nuts 169, by the adjustment of which the weights 166 may be located at different set positions outwardly along the rods. This enables the torsional inertia of the device to be adjusted.

The torsional damping spring 131 has its adjacent end secured to the rotatable inertia cylinder 130 by clamping washers 151 secured to the cylinder by screws 152. The other end of the torsional spring has fixed anchorage to the conductor 15 by a spring clamp 153 which is identical to the spring clamp 53, and which therefore need not be described again.

In FIGURES 9, 10 and 11 I have illustrated still another construction of my invention, which also embodies the above described features of the roller bearing mounting and of the outwardly disposed adjustable weights, but obtains these features in a more simple, more compact structure. The inner bearing sleeve 229 and the outer inertia cylinder 230 are both made relatively short, and have only a single circumferential row of roller bearings 264 therebetween. The inner bearing sleeve 229 is split longitudinally into two halves 229' and 229" which are secured together over the conductor 15 by clamping screws 241. The opposing faces of these two split halves have stepped matching surfaces, indicated at 272 to insure matching alignment of the two halves. As shown in longitudinal section in FIGURE 10, this inner bearing sleeve 229 is of spool-shaped cross section, comprising end flanges or heads 274 between which are confined the outer inertia cylinder 230 and the single row of roller bearings 264. Passing down through the end flanges or heads 274 are threaded set screws 244 which engage the conductor 15 for anchoring this inner bearing sleeve 229 against rotation on the conductor.

The outer inertia cylinder 230 is split longitudinally into two halves 230' and 230" which are secured together by clamping screws 247. At diametrically opposite points, the inertia sleeve 230 is formed with sockets 267 in which are threaded or welded the outwardly projecting rods 265 on which are mounted the inertia weights 266. These two inertia weights 266 can be adjusted inwardly or outwardly along their supporting rods 265 by screwing inner and outer nuts 269 inwardly and outwardly along the threads 268. The torsional damping spring 231 has its adjacent end secured to the rotatable inertia cylinder 230 by one or more clamping washers 251 secured to the cylinder by screws 252. The other end of the torsional spring has fixed anchorage to the conductor 15 by a spring clamp identical to the previously described spring clamps 53 and 153.

In each of the above described embodiments the helical torsion spring is of sufficient length to permit the rotatable inertia cylinder to have a substantial amplitude of rotation. It will also be noted that each of the embodiments is reversible in its torsion damping characteristics, i.e. the rotatable torsion damping cylinder is substantially as free to rotate in one direction as it is in the other, being subject to substantially the same spring retardation to either direction of rotation. Moreover, my improved suppression devices are equally applicable to stranded, solid or tubular conductors. Furthermore, as previously described, all parts of the device can be assembled over the conductor from the side of the conductor rather than the end.

One hypothesis for the torsional or twisting motion of the conductor is that because the suspended span of the conductor hangs down in a catenary or sagging curve, wherein the length of the conductor along the underside of this curve is greater than the length of the conductor along the upper side of the curve, it should follow that with respect to the median axis of the conductor, the under side of the curve should be under tension and the upper side of the curve should be under compression, resulting in a rotative couple or unstable condition in the conductor, tending to generate rotative twist. However, irrespective of the forces or causes of this torsional twist in the conductor, the previously described tests conducted by me served to clearly establish that the torsional twist was always present in the galloping phenomena and that my improved suppression apparatus either eliminated or greatly mitigated this galloping by damping this torsional twist.

While I have illustrated and described what I regard to be the preferred embodiments of my invention, nevertheless it will be understood that such are merely exemplary and that numerous modifications and rearrangements may be made therein without departing from the scope of the invention.

I claim:

1. In apparatus of the class described for suppressing galloping oscillations in a suspended conductor, which galloping oscillations are characterized by substantially transverse components of motion having such large amplitudes and such low frequencies as to render such transverse components of motion readily visible, and which galloping oscillations are further characterized by torsional components of motion causing a twisting and untwisting of the conductor in a coupled relationship to the substantially transverse components of motion in the conductor, the combination of a longitudinally split bearing sleeve, means for fixedly mounting said bearing sleeve over the conductor with the conductor extending longitudinally therethrough, a longitudinally split torsional inertia member, means for securing the sections of said inertia member together over said bearing sleeve for rotation about the conductor as an axis, anti-friction roller bearings between said bearing sleeve and said inertia member, rods extending outwardly from said inertia member, weights adjustably positioned on said rods for increasing the torsional inertia of said member, a helically coiled spring having its convolutions surrounding said conductor, means for fastening one end of said spring to said inertia member, and clamping means for anchoring the other end of said spring to said conductor, whereby said spring is operative by winding and unwinding axially of the conductor to torsionally resist the rotation of said inertia member in opposite directions of rotation during galloping oscillations and whereby said spring returns said inertia member to a substantially normal angular position with respect to said bearing sleeve and conductor upon the cessation of said galloping oscillations.

2. In apparatus of the class described for suppressing galloping oscillations in a suspended conductor, which galloping oscillations are characterized by substantially transverse components of motion having such large amplitudes and such low frequencies as to render such transverse components of motion readily visible, and which galloping oscillations are further characterized by torsional components of motion causing a twisting and untwisting of the conductor in a coupled relationship to the substantially transverse components of motion in the conductor, the combination of a longitudinally split bearing sleeve, means for fixedly mounting said bearing sleeve over the conductor with the conductor extending longitudinally therethrough, a longitudinally split inertia cylinder for rotative mounting on said bearing sleeve, diametrically split end disks secured in the ends of said cylinder, longitudinally split bearing hubs secured to said split end disks, and having rotative bearing mounting on said bearing sleeve, annular shoulders on said split bearing sleeve cooperating with said bearing hubs for preventing axial shifting of said inertia cylinder longitudinally of said bearing sleeve and of said conductor, a helically coiled spring having its convolutions surrounding said conductor, means for securing one end of said spring to said inertia cylinder, and split clamping means for connecting the other end of said spring to said conductor.

3. In apparatus of the class described for suppressing galloping oscillations in a suspended conductor, which galloping oscillations are characterized by substantially vertical components of motion having such large amplitudes and such low frequencies as to render such vertical components of motion readily visible, and which galloping oscillations are further characterized by torsional components of motion causing a twisting and untwisting of the conductor in a phased relationship to the substantially vertical components of motion, the combination of a longitudinally split bearing sleeve, means for fixedly mounting said bearing sleeve over the conductor with the conductor extending longitudinally therethrough, a longitudinally split torsional inertia member, means for securing the split sections of said inertia member together over said bearing sleeve for rotation about the axis of said bearing sleeve, two rows of anti-friction bearings between said inertia member and said bearing sleeve, one row of anti-friction bearings being disposed at each end of said inertia member, means cooperating with said anti-friction bearings for preventing axial shifting motion of said inertia member longitudinally of said conductor, a helically coiled spring having its convolutions surrounding said conductor, means for connecting one end of said spring to said inertia member, and clamping means for connecting the other end of said spring to said conductor.

4. In apparatus of the class described for suppressing galloping oscillations in a suspended conductor, which galloping oscillations are characterized by substantially vertical components of motion having such large amplitudes and such low frequencies as to render such vertical components of motion readily visible, and which galloping oscillations are further characterized by torsional components of motion causing a twisting and untwisting of the conductor in a phased relationship to the substantially vertical components of motion, the combination of a spool-shaped bearing sleeve having outwardly extending flanges at its ends, said bearing sleeve being longitudinally split into two sections, means for securing said two sections together over the conductor with the conductor extending longitudinally through said bearing sleeve, a longitudinally split torsional inertia member, means for securing the sections of said inertia member together over said bearing sleeve for rotation about the conductor as an axis, a single row of anti-friction roller bearings between said bearing sleeve and said inertia member and confined against endwise displacement by said outwardly projecting flanges, means cooperating between said bearing sleeve and said inertia member preventing longitudinal shifting motion of said inertia member axially of said bearing sleeve and of said conductor, a helically coiled spring having its convolutions surrounding said conductor, means for connecting one end of said spring to said inertia member, and clamping means for connecting the other end of said spring to said conductor, whereby said spring torsionally resists the rotative movement of said inertia member by winding and unwinding with the opposite directions of rotation of said inertia member in the operation of suppressing galloping oscillations.

5. In apparatus for suppressing wind-induced galloping oscillations in an aerial conductor supported by spaced insulators, which galloping oscillations are characterized by substantially vertical components of motion having large amplitudes and low frequencies, and also by torsional components of motion causing a twisting and untwisting of the conductor in a phased relationship to the substantially vertical components of motion, the combination of a rotatable torsional inertia member mounted on the aerial conductor at a point between said insulators for rotation about the conductor as an axis, mounting means secured fast to the conductor serving as bearing means for revolvably supporting said inertia member for rotation at a fixed radius about the axis of the conductor, whereby all portions of said inertia member remain at the same radius from the conductor axis throughout all rotative movements of said inertia member in suppressing galloping oscillations, means for positively holding said rotatable inertia member against axial shifting along the length of said conductor, and a helically coiled spring coiled lengthwise about the conductor and having one end anchored to the conductor and having its other end secured to said rotatable inertia member, said helically coiled spring permitting rotation of said inertia member around the axis of said conductor through an amplitude of rotation in excess of 90° in either direction of rotation whereby the amplitudes of rotation in opposite directions equal at least 180° of rotation of said inertia member around the conductor axis.

6. In apparatus for mitigating wind-induced galloping oscillations in an aerial conductor supported by spaced insulators, which galloping oscillations are characterized by substantially vertical components of motion having such large amplitudes and such low frequencies as to render such vertical components of motion readily visible, and which galloping oscillations are further characterized by torsional components of motion causing a twisting and untwisting of the conductor in a definite relationship to the substantially vertical components of motion, the combination of a rotatable torsional inertia member mounted on the aerial conductor at a point between said insulators for rotation about the conductor as an axis, bearing sleeve means secured fast to the conductor and affording a bearing surface around whiche said inertia member is adapted to revolve, said inertia member being of solid construction from its inner bearing engagement on said bearing sleeve means out to its outer periphery whereby all portions of said inertia member fixedly remain at the same radius from the conductor axis throughout all rotary or other movement of said inertia member in suppressing galloping oscillations, said bearing sleeve means including means for preventing axial shifting motion of said inertia member along said conductor, and a helically coiled spring coiled lengthwise about the conductor and having one end anchored to the conductor and the other end anchored to said rotatable inertia member, whereby said inertia member can revolve about the axis of said conductor against the torsion of said spring in the act of suppressing galloping oscillations but wherein said inertia member is always returned by said helical spring to a normal angular position with respect to the conductor upon the cessation of such galloping oscillations.

7. In apparatus for mitigating wind-induced galloping oscillations in an aerial conductor suspended from spaced insulators, which galloping oscillations are characterized by substantially transverse components of motion having large amplitudes and low frequencies, and are further characterized by torsional components of motion causing a twisting and untwisting of the conductor during the substantially transverse components of motion, the combination of a bearing sleeve fixedly mounted on said conductor at a point spaced substantially from said insulators, an axially split torsional inertia member having rotatable bearing support on said bearing sleeve and being of solid construction whereby all portions of said inertia member remain at the same radius from the axis of said conductor during all rotative movements of said inertia member in mitigating galloping oscillations, means associated with said bearing sleeve for preventing axial shifting motion of said inertia member axially along said conductor, and a helically coiled torsional spring surrounding said conductor and having one end anchored to said inertia member and having its other end anchored to said conductor, whereby said spring is adapted to wind and unwind axially of the conductor in the opposite directions of rotation of said inertia member.

8. In apparatus for suppressing wind induced galloping oscillations in an aerial conductor supported by spaced insulators, which galloping oscillations have readily visible substantially vertical components of motion of relatively large amplitude and relatively low frequency, and which vertical components of motion are also accompanied by torsional components of motion causing a twisting and untwisting of the conductor in a definitely phased relation to the vertical components of motion in the conductor, the combination of a galloping suppression apparatus comprising a bearing sleeve secured fast to said conductor at a point substantially midway between the points of support established by said insulators, external bearing surfaces on said bearing sleeve, a rotatable outer torsional inertia member of substantial mass rotatably mounted on said bearing sleeve, said inertia member having internal bearing surfaces therein which have free sliding rotative bearing engagement with the external bearing surfaces on said bearing sleeve to permit free sliding surface rotation of said torsional inertia member on said bearing sleeve of 180° or more in angular motion, and a torsional coiled spring having its convolutions surrounding said conductor and having anchored attachment at one end to said torsional inertia member and having anchored attachment at its other end to said conductor, said coiled spring permitting rotational motion of said torsional inertia member in either direction of rotation around said bearing sleeve substantially at the frequency of said torsional components of motion in the conductor and in opposition thereto for thereby suppressing the substantially vertical galloping components of motion in the conductor.

9. In apparatus for suppressing wind induced galloping oscillations in an aerial conductor supported by spaced insulators, such galloping oscillations having substantially vertical, large amplitude, low frequency components of motion which are readily visible and which are also accompanied by torsional components of motion causing a twisting and untwisting of the conductor in a phased relationship to the substantially vertical components of motion, the combination of galloping suppression apparatus comprising a rigid metallic bearing sleeve secured fast to said conductor at a point substantially midway between the points of support established by said insulators, a rotatable outer torsional inertia member of substantial mass rotatably mounted on said bearing sleeve, external bearing surfaces on said bearing sleeve and co-acting internal bearing surfaces within said torsional inertia member having free rolling rotative bearing engagement with each other, a torsional coiled spring surrounding said conductor and having one end anchored to said conductor and having its other end anchored to said torsional inertia member, said coiled spring being operative to oppose substantially the same degree of resistance to either direction of rotation of said inertia member, and having a relatively large number of convolutions therein to permit a relatively large degree of angular rotation of said inertia member in either direction of rotation about said bearing sleeve, whereby to exert a suppressing influence on said torsional components of motion and hence on the substantially vertical components of motion in the conductor.

10. In apparatus for suppressing wind induced galloping oscillations in an aerial conductor suspended between spaced insulators, which galloping oscillations have substantially transverse large amplitude, low frequency components of motion which are readily visible and which are also accompanied by torsional components of motion causing a twisting and untwisting of the conductor in a coupled relationship to the substantially transverse components of motion in the conductor, the combination of an axially split bearing sleeve adapted for fixed mounting over the conductor at a point substantially midway between said spaced insulators with the conductor extending axially thereof, bearing surfaces carried on said bearing sleeve, a longitudinally split torsional inertia member adapted to be assembled over said bearing sleeve and having bearing surfaces capable of free sliding rotation on the bearing surfaces of said bearing sleeve, and a damping torsional spring having a plurality of helical convolutions therein connected at one end with said inertia member and at its other end with said conductor and operative to impose torsional damping on either direction of rotation of said torsional inertia member for suppression of the torsional components of motion in the conductor and thereby suppressing the substantially transverse components of motion therein.

References Cited in the file of this patent

UNITED STATES PATENTS

| | | |
|---|---|---|
| 1,763,064 | Paton et al. | June 10, 1930 |
| 1,766,995 | Hofmann | June 24, 1930 |
| 2,098,456 | Walsh | Aug. 10, 1937 |
| 2,635,898 | Silverman | Apr. 21, 1953 |
| 2,694,101 | Shuhart | Nov. 9, 1954 |

FOREIGN PATENTS

| | | |
|---|---|---|
| 186,645 | Switzerland | Dec. 16, 1936 |
| 503,445 | Great Britain | Apr. 6, 1939 |
| 719,015 | Germany | Mar. 28, 1942 |
| 542,670 | Italy | Apr. 30, 1956 |